March 30, 1943.     D. F. LINSLEY     2,315,343
BACK LASH TAKE-UP
Filed March 25, 1942
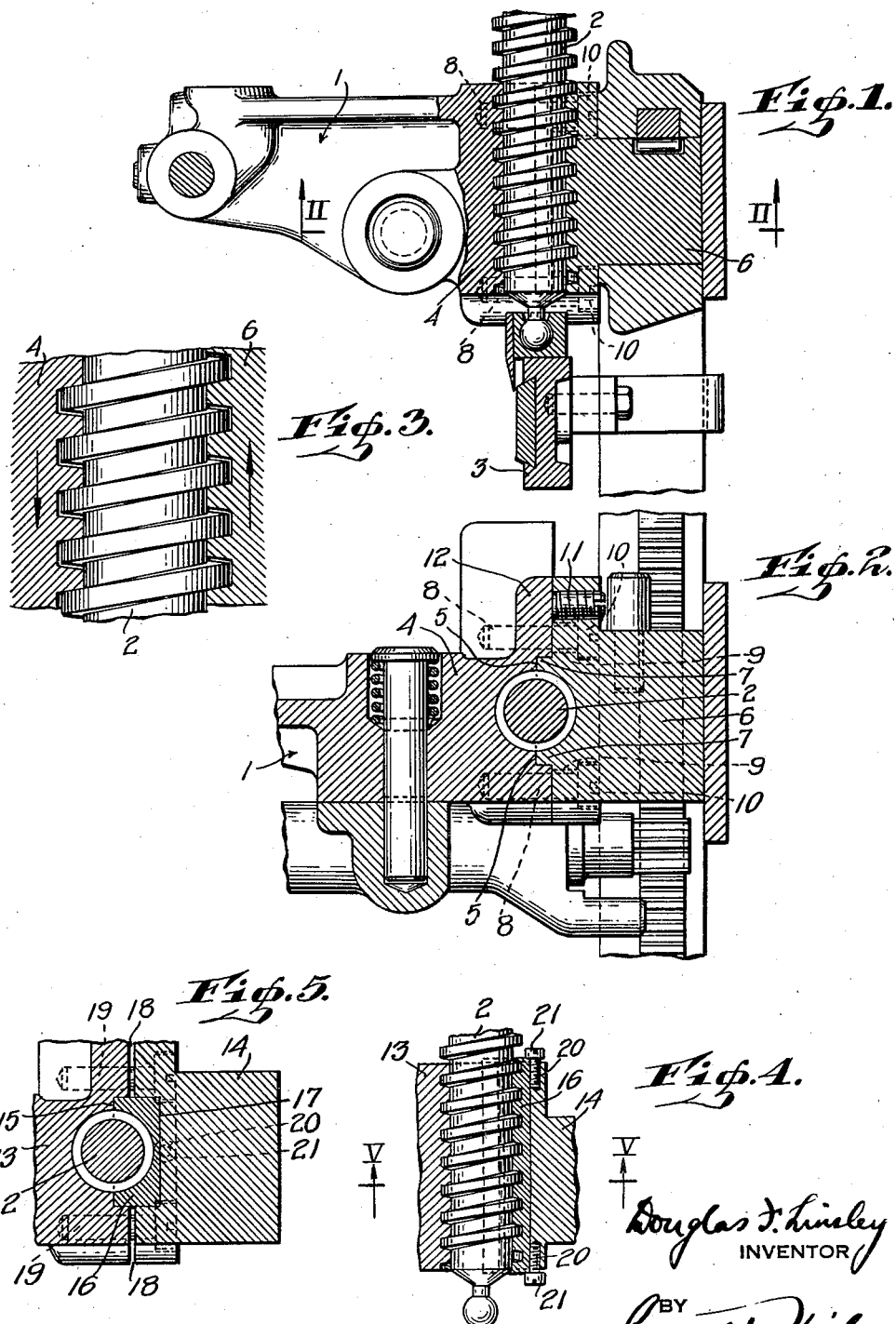

Patented Mar. 30, 1943

2,315,343

UNITED STATES PATENT OFFICE 2,315,343

BACKLASH TAKE-UP

Douglas F. Linsley, Greenwich, Conn., assignor to Schick Incorporated, Stamford, Conn., a corporation of Delaware Application March 25, 1942, Serial No. 436,126

8 Claims. (Cl. 74—441)

The general object of the invention is to facilitate the taking up of play or back-lash between a screw and the member in which it is threaded, such play or back-lash either existing at the outset as an incident of the "fit" to which the parts are made or resulting from subsequent wear. In other words, the invention is of advantage not only in providing a simple and convenient means of prolonging the useful life of the device to which it is applied but also, in some cases, in avoiding the need for holding the parts to extremely close tolerances in the course of manufacture.

The invention is more particularly concerned with the problem as it is encountered in precision instruments or like situations where the work done by or on the screw is relatively light but where the establishment and maintenance of a close working fit between the screw and its cooperating parts is of considerable importance to the accurate use of the instrument. In such instruments it frequently happens that the space available is quite limited and a further object of the invention is a construction which does not require any or any substantial enlargement of the parts or any appurtenances which would interfere with or make difficult the application of the invention to existing designs of such instruments or machines.

Other objects and advantages will be apparent from the following detailed description of two illustrative forms of the invention and from the accompanying drawing. Of the latter, Fig. 1 is a broken-out, sectional view illustrating one application of the invention; Fig. 2 is a section on the line II—II of Fig. 1; Fig. 3 is an enlarged, broken-out detail; Fig. 4 is a sectional view of another form of the invention; and Fig. 5 is a section on the line V—V of Fig. 4.

In Figs. 1 and 2 the invention is shown applied to the carriage, designated generally by reference 1, of a stadimeter of the kind illustrated and described in copending application, Serial No. 434,932, filed March 16, 1942. As will be understood by those familiar with such instruments, the screw 2 shown as passing through the carriage is the adjusting screw by which the position of scale arm 3 is controlled; but since the details of construction and mode of operation of that particular instrument are no part and are not necessary to an understanding of the present invention, they will not be described. The carriage 1 simply typifies a block or bearing in which a lead or adjusting screw 2 operates and to which the invention may be applied for the stated purposes.

In accordance with the invention, the carriage or part in which screw 2 operates consists of two members, 4 and 6, having a sliding fit one on the other and held in axial alinement by suitable means such as a key-like connection. The threaded hole in which the screw operates is formed one-half in each of two opposing faces of the members. Preferably, and as illustrated in this form of the invention, a channel or keyway 5 is formed in member 4 and in the bottom or rear wall of the channel itself is a half-round recess threaded to embrace one-half of screw 2. The second member 6 (which forms the base of the carriage) has a sliding fit in the channel or keyway 5, as indicated at 7; and member 6 is likewise provided with a half-round recess which is threaded to embrace the other half of screw 2. Sliding movements of the members 4 and 6 relatively to each other are thus confined to a direction parallel to the axis of the screw.

Member 6 is secured to member 4 by bolts 8, which are threaded into member 4 but pass through slots or enlarged holes 9 in member 6. In the drawing they are shown as over-size holes, since in this instance the bolts are not relied on to maintain axial alinement of members 4 and 6. The bolt heads 10 serve to clamp the members together.

In order to take up play or back-lash between the screw and the carriage, bolts 8 are slackened and members 4 and 6 are moved relatively to each other, axially of the screw, until the play is eliminated. Such movement is permitted by the enlarged holes 9 in member 6. Bolts 8 are then tightened. It is desirable to provide means additional to the clamping action of the bolt heads to lock the members securely against accidental displacement relatively to each other axially of the screw 2 and this function is served by a set screw 11 which passes through a portion of member 6 and engages the overlying face of a boss 12 on member 4.

The taking up of the play or back-lash is indicated somewhat diagrammatically in Fig. 3 from which it will be apparent that as members 4 and 6 are moved relatively to each other (as in the directions indicated by the arrows) the threads on member 4 will be brought to bear on the tops of the threads on the left-hand side of the screw 2, as viewed in that figure, and the threads on member 6 will be brought to bear on the bottoms of the threads on the right-hand side of screw 2. In the result, of course, end thrust is subsequently taken by one-half only of screw 2 but in instruments of the kind referred to and other situations where the loads encountered are relatively light, this is of no consequence.

In the foregoing construction, the parts 4 and 6 of carriage 1 are required to be moved relatively to each other to take up the play or backlash and while the amount of such movement is likely to be slight, situations are encountered in which it is desirable to preserve precisely the original relationship between the members 4 and 6, or their equivalent parts in the particular instrument involved. Figs. 4 and 5 illustrate a construction whereby that is accomplished while still making available the same type of backlash take-up.

In these figures the reference characters 13 and 14 designate the parts of the carriage or similar part corresponding generally to members 4 and 6; and member 13, like member 4, is shown as provided with a channel 15 and a threaded half-round recess to embrace one-half of screw 2. In this instance, however, a third member or block 16 is interposed between members 13 and 14 and the half-round, threaded recess to embrace the other half of screw 2 is formed in this third member. As shown, block 16 is formed to slide not only in channel 15 of member 13 but also in a corresponding channel 17 in member 14, the block preferably being of such thickness as to leave clearance 18 between the opposed faces of members 13 and 14.

In this construction the three parts 13, 16 and 14 may be clamped together by bolts 19, the bolts snugly fitting their holes in members 13 and 14, so as to prevent relative movement between such members axially of the screw. As will be understood, back-lash or play is taken up in this form of the invention by slackening bolts 19 and adjusting member 16, its adjusted position relative to member 13 corresponding to the position of member 6 relative to member 4 as shown in Fig. 3.

Means are provided for locking block 16 against unintentional displacement axially of the screw and in the illustrated construction this is achieved by making block 16 of such a length that its ends extend beyond the sides or ends of member 14 (Fig. 4) and the block is locked in its required position of adjustment by screws 20 having heads 21 overlying the ends of block 16. As will be apparent, a nice adjustment of the block is obtained by loosening the screw 20 toward which it is desired to move the block and tightening the other screw 20.

Two forms only of the invention have been described and illustrated and while the specific characteristics common to these two forms have definite advantages from the standpoint of compactness, effectiveness and facility of manufacture, the essential principles can be applied in a variety of forms adapted to the needs of the particular instrument or device to which the invention is required to be applied.

The following is claimed:

1. The combination with a screw, of a member having a channel formed in one face and, formed in the bottom of the channel, a half-round recess threaded to embrace one-half of the screw, a block having a sliding fit in said channel, and, formed in the face of the block opposed to the bottom of the channel, a half-round recess threaded to embrace the other half of the screw, said block dimensioned to project outside of the said channel, a second member channeled to a depth to receive the projecting portion of the block with clearance between opposed faces of said members at the sides of their respective channels, bolts securing said members together independently of said block, the latter being of a length (in the direction of the axis of the screw) to extend beyond the ends of one of said members, and locking screws in the said ends of such member with heads overlying the projecting ends of the block.

2. The combination with a screw, of a member having a channel formed in one face, and, formed in the bottom of the channel, a half-round recess threaded to embrace one-half of the screw, a block having a sliding fit in said channel, and, formed in the face of the block opposed to the bottom of the channel, a half-round recess threaded to embrace the other half of the screw, said block dimensioned to project outside of the said channel, a second member channeled to a depth to receive part, at least, of the projecting portion of the block, bolts securing said members together independently of said block, the latter being of a length (in the direction of the axis of the screw) to extend beyond the ends of one of said members, and means engaging the projecting ends of the block to lock the same against movement relatively to said members.

3. The combination with a screw, of a member having a channel formed in one face, and, formed in a wall of the channel, a half-round recess threaded to embrace one-half of the screw, a block having a sliding fit in said channel, and, formed in the face of the block opposed to said wall of the channel, a half-round recess threaded to embrace the other half of the screw, said block dimensioned to project outside of the said channel, a second member channeled to a depth to receive part, at least, of the projecting portion of the block, means for locking said members together independently of said block, and means for locking the block to one of said members.

4. The combination with a screw, of a member having a channel formed in one face, and, formed in a wall of the channel, a half-round recess threaded to embrace one-half of the screw, a block having a sliding fit in said channel, and, formed in the face of the block opposed to said wall of the channel, a half-round recess threaded to embrace the other half of the screw, said block dimensioned to project outside of the said channel, a second member channeled to a depth to receive part, at least, of the projecting portion of the block, and means for locking said members and block together in different positions of adjustment of the block relatively to the members axially of the screw.

5. The combination with a screw, of a member having a channel formed in one face and, formed in a wall of the channel, a half-round recess threaded to embrace one-half of the screw, a second member having a sliding fit in said channel and a half-round recess threaded to embrace the other half of the screw, said second member being dimensioned to project outside of the said channel and overlie the faces of the first member on each side of its channel, bolts for clamping said members together, the bolt holes in one member being enlarged in the direction of the axis of the screw to permit adjustment of the members relatively to each other in such direction, and means for locking said members in any position of adjustment.

6. The combination with a screw, of a member having a channel in one face thereof and, formed in a wall of the channel, a half-round recess threaded to embrace one-half of the screw, a second member having a sliding fit in said channel and a half-round recess threaded to embrace the other half of the screw, and means for locking said members in different positions of adjustment with respect to each other axially of the screw.

7. The combination with a screw, of two members having abutting faces and in such faces a half-round recess threaded to embrace one-half of the screw, a key and key-way connection between said members arranged axially of the screw and means for locking said members together.

8. The combination with a screw, of two members having opposed half-round recesses threaded to embrace the screw, one of said members having a key connection with the other arranged axially of the screw and means for locking said members together.

DOUGLAS F. LINSLEY.